Jan. 13, 1970    R. KOBLER ET AL    3,489,492
FILM PROJECTOR FOR EDUCATIONAL APPARATUS
Filed Dec. 19, 1966    2 Sheets-Sheet 1
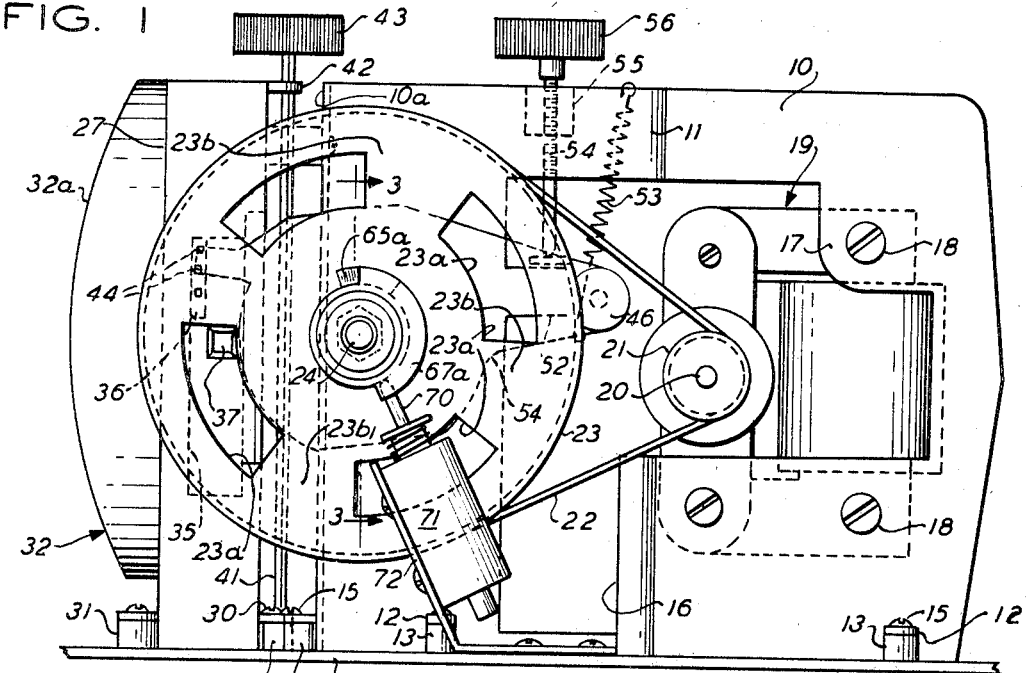
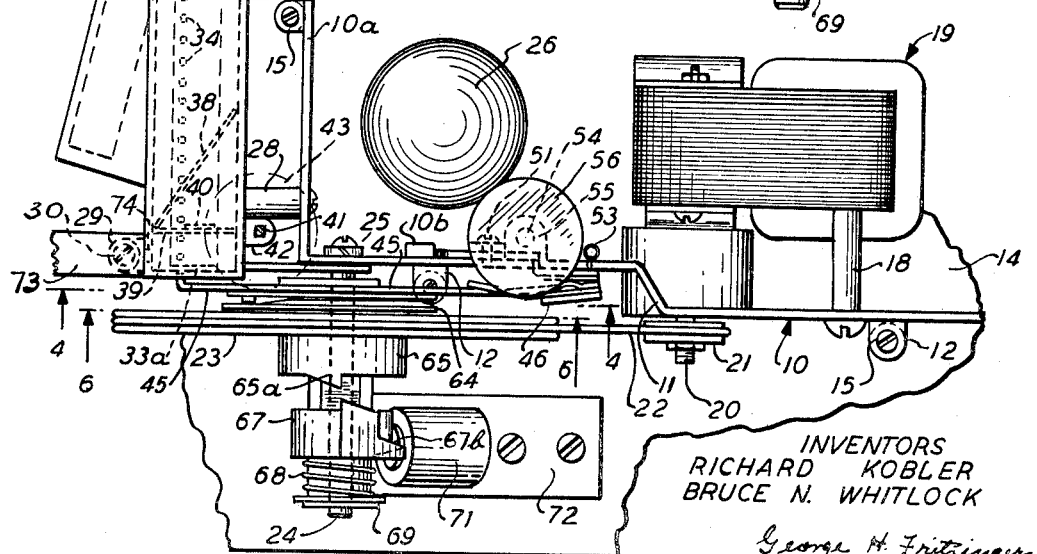
INVENTORS
RICHARD KOBLER
BRUCE N. WHITLOCK
BY *George H. Fritzinger*
AGENT Jan. 13, 1970    R. KOBLER ET AL    3,489,492
FILM PROJECTOR FOR EDUCATIONAL APPARATUS
Filed Dec. 19, 1966    2 Sheets-Sheet 2
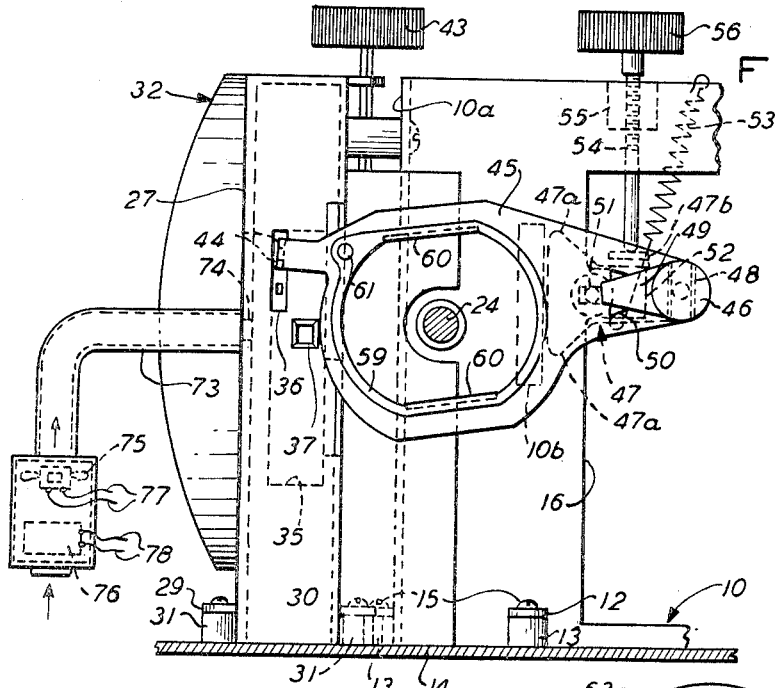
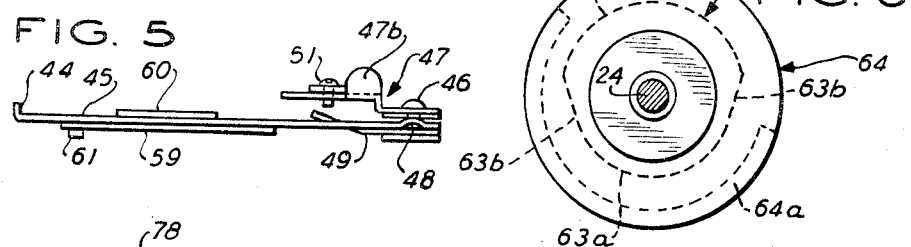
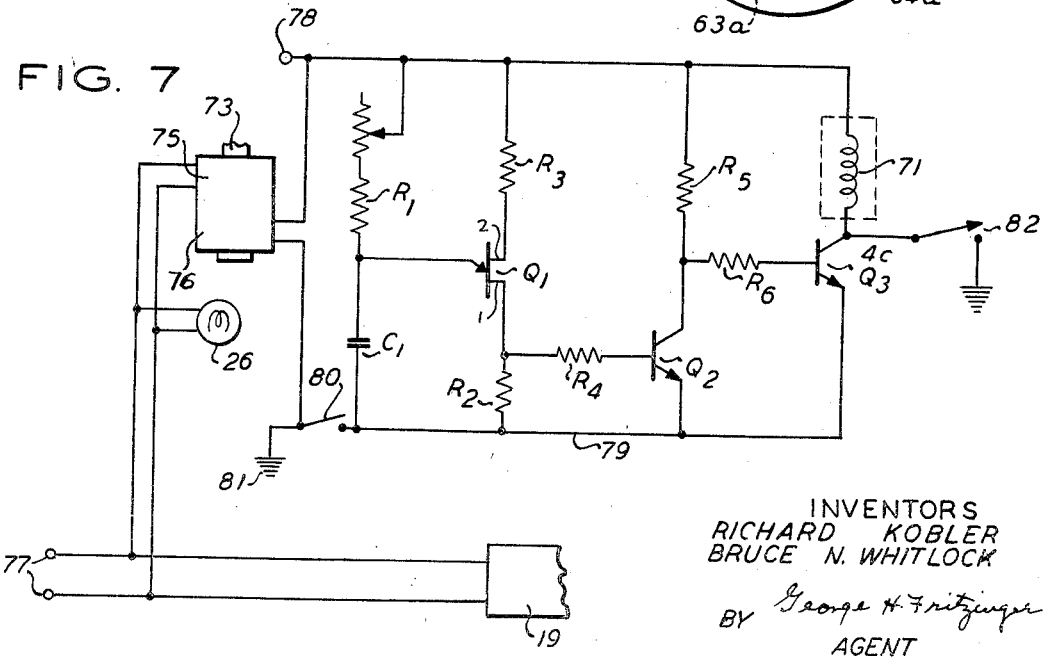
INVENTORS
RICHARD KOBLER
BRUCE N. WHITLOCK
BY George H. Fritzinger
AGENT United States Patent Office 3,489,492
Patented Jan. 13, 1970

3,489,492
FILM PROJECTOR FOR EDUCATIONAL
APPARATUS
Richard Kobler, West Orange, and Bruce N. Whitlock, Morris Plains, N.J., assignors to McGraw-Edison Company, Elgin, Ill., a corporation of Delaware
Filed Dec. 19, 1966, Ser. No. 602,953
Int. Cl. G03b 21/38, 21/16, 21/32
U.S. Cl. 352—169                                    4 Claims

ABSTRACT OF THE DISCLOSURE

A film projector for educational purposes is selectively operable for still showing of the frames or for showing the frames in succession to depict motion. The film projector has a continuously rotating shutter, a drive pawl for engaging successive drive holes in the film to advance the film by one frame during each revolution of a shutter, a rotatable cam operable during each revolution thereof to actuate the drive pawl through one cycle, a drive clutch between the shutter and cam biased into engaged position and latchable in disengaged position, a solenoid for unlatching the clutch out of disengaged position and a cam effective when the solenoid is deenergized for disengaging the clutch at the end of revolution then underway. The solenoid is operated by a pulse circuit which when energized will produce a single frame advance of the film.

---

An object of the invention is to provide a film projector with a novel and simple drive mechanism which is selectively operable for the purpose stated.

Another object is to provide such improved film projector which during the still showing of a frame has the same viewing quality as during the showing of motion.

Another object is to provide a film projector which can be shifted from the still showing of one frame to the still showing of another frame without any noticeable flicker.

Features of the invention reside in providing a film projector with a shutter wheel which is run continuously during the still showing of a frame, as well as during the showing of motion, in providing such film projector wherein the drive claw or sprocket for the film is clutched to and from the rotating shutter wheel to advance the film as desired, in providing such clutch which is of the one-revolution single-tooth integrating type to enable the drive claw to be moved through a single or any integral number of cycles, in cooling the film during the still showing of a frame so that the intense heat from the projector lamp will not distort the film while at standstill, and in providing a pulse circuit which when energized will provide a momentary operation of the clutch to move the drive claw through a single cycle whereby to effect a single frame advance.

These and other objects and features of the invention will be apparent from the following description and the appended claims.

In the description of my invention reference is had to the accompanying drawings of which:

FIGURE 1 is a fractional side elevation of a film projector according to our invention;

FIGURE 2 is a top plan view of this projector;

FIGURE 3 is a fractional sectional view taken on the line 3—3 of FIGURE 1;

FIGURE 4 is a vertical sectional view taken on the line 4—4 of FIGURE 2;

FIGURE 5 is a top plan view of the reciprocating claw member for intermittently advancing the film;

FIGURE 6 is an end view of the cam for operating the drive claw taken on the section line 6—6 of FIGURE 2;

FIGURE 7 is a schematic circuit diagram of the machine.

The film projector shown in the accompanying drawings comprises a vertical frame plate 10 which as viewed from the front in FIGURE 1 has a left portion offset to the rear at 11 and which has a right angle bend at its left end terminating in a rearwardly extending wall 10a. The plate has a series of apertured lugs 12 welded thereto near the bottom edge thereof which seat on respective posts 13 upstanding from a base 14 and which are secured to these posts by screw 15. The frame plate has a large right angular opening 16 with a corner extension 17 at its upper right-hand portion. Extending through an aperture in the corner extension 17 and through the plate directly therebelow are mounting bolts 18 for a drive motor 19. The motor has a drive shaft 20 extending through the opening 16 on which is mounted a drive pulley 21. The drive pulley 21 is coupled by a belt 22 to a shutter wheel 23 journaled on a horizontal shaft 24 secured by a screw and lock washer 25 to a left-hand portion of the frame plate 10 about midway the height thereof. The shutter wheel has four identical arcuate openings 23a at 90° intervals each approximately 55° long and four intervening opaque sections 23b each approximately 35° long.

Mounted on the base 14 about midway between the motor 19 and the wall 10a is a projector lamp 26. Mounted on the base at the left side of the wall 10a in spaced relation thereto is a film cartridge holder 27. This holder is secured through a spacer 28 to the wall 10a and has two lugs 29 at its right side and one at its left side secured by screws 30 to posts 31 on the base 14 (FIGURES 1 and 2). The holder 27 is open to the rear to receive a cartridge 32 for a continuous film 33 having successive frames with a pair of drive holes 34 in a border portion thereof for each frame. The cartridge is of a standard construction having an oblique portion 32a at its left side in which a loose roll of film is stored. A run 33a of the film is lead off from the outside of the roll to the front of the cartridge whereat it leads downwardly to the bottom of the cartridge and then back to the inside of the roll. The cartridge has a front opening 35 to expose the front run 33a of the film, and the holder 27 has a slot opening 36 to expose a total of three drive holes of the film and a lens opening 37 to expose a single frame of the film. In the wall 10a there is an opening (not shown) through which light from the lamp 26 is directed onto an oblique mirror plate 38 (FIGURE 2). Secured to the front edge of this plate at an acute angle thereto is a front plate 39 in which is mounted a lens 40. The lens and mirror plates 38–39 are slidably and pivotally mounted in the well known manner, and are coupled to a vertical shaft 41 pivoted in lugs 42 extending horizontally from the holder 27. On the upper end of this shaft is a manual knob 43 which enables the mirror and lens to be swung inwardly into an operative position shown in FIGURE 2, so that light from the lamp 26 will be reflected from the mirror plate 38 through the lens 40 and film onto a screen (not shown) or into a retracted position wherein the mirror and lens plates are shifted to the right of the holder 27 to allow the cartridge to be removed.

The film 33 is advanced intermittently by a pair of drive claws (FIGURE 4) which are turned inwardly from a cantilever-type drive member 45 made of a spring type metal. The drive member is pivoted to a stud pin 46 which is riveted to a forwardly offset right end portion of a bracket 47 (FIGURE 5). The portion of the drive member 45 traversed by the stud pin 46 is bowed at 48 to provide a friction pivot joint. Between this bowed portion and the head of the pivot stud is a cantilever spring 49 having an arm of tapered width which passes through an opening 50 in the drive member 45 to allow the end of the cantilever spring to be anchored against the back side of the drive member whereby to bias the drive member forwardly as it appears in FIGURE 4. The bracket 47 is pivoted by a stud pin 51 to a lug 52 on the frame plate 10 extending rightwardly into the opening 16. The bracket 47 has upper and lower wings 47a at its left end which serve by abutment against a bar 10b welded to the inner wall of the frame plate 10 to provide upper and lower limits on the pivotal movement of the bracket about the stud 51. The bracket is urged upwardly about the stud pin 51 by a tension spring 53 hooked at its lower end to the bracket and at its upper end on the upper edge of the frame plate 10. The bracket is adjustable about the pin 51 by a screw 54 threaded through a bearing 55 welded to the back side of the frame plate 10. The screw 54 has a manual knob 56 at its upper end and bears at its lower end against a side lug 47b on the bracket. By this adjustment of the bracket the pivot center of the drive member 45 is shifted downwardly or upwardly to provide proper vertical positioning of the frame being shown with respect to the lens.

The drive member 45 has a large central opening lined along its edge by a ferrule 59 of hardened material serving as a cam follower. The cam follower has upper and lower flats 60 formed by inwardly turned edges thereof, and has a hardened pin 61 staked thereto. Journaled on the shaft 24 is a sleeve 62 which is staked at its inner end to a cam 63 (FIGURES 3 and 6). This cam has a circular portion 63a of smaller radius about 145° long which is joined by tangent lines 63b to a dwell 63c of larger radius also about 145° long. Secured against an inner shoulder of the cam 63 is a circular plate 64 having an arcuate cam 64a in its sidewall confronting the cam 63 approximately 200° long as shown in FIGURE 6. The cam 63 is located within the follower 59 of the drive member 45 with the pin 61 of the follower bearing against the cam plate 64 under pressure of the bias spring 49. In the positioning of the cams 63–64 shown in FIGURES 1 and 6, the arcuate cam 64a has just moved onto the pin 61 to engage the drive claws 44 with the film. As the cams 63–64 and shutter wheel are turned clockwise about 50° from this position, (1) the arcuate cam 64a continues to ride on the pin 61 to hold the drive claws 44 engaged with the film, (2) the shutter wheel 23 reaches a point where the opaque section 23b1 is at the edge of the light beam from the lens 40, and (3) the leading edge of the cam 63c reaches the lower flat 60 of the cam followers 59. Within a next approximate 35° movement of the cams and shutter wheel, the opaque section 23b1 continues to intercept the light beam and the cam 63c is moved onto the lower flat 60 of the cam follower to move the claws 44 downwardly to advance the film by one frame. This point in the movement of the cams may be considered as their start position since it is here where the cams are stopped after each frame advance, as will appear. The end position of the frame advance is adjustable by turning the knob 56 as before explained. This adjustment is utilized to bring the frame into a correct vertical position during the showing thereof.

In an approximate one-half revolution of clockwise movement of the cams 63–64 following the advance of the film by one frame, the raised portion of the cam 64a rides off of the pin 61 allowing the claws 44 to disengage responsive to the spring 49 while the dwell 63c continues to engage lower flat 60 and then the leading edge of the cam 63c engages the upper flat 60 to shift the drive claws upwardly into registration with the two upper drive holes of the film exposed through the opening 36. In the next one-half revolution of the cam 63–64 the claws are engaged with the drive holes (responsive to approximately 145° movement of the cams) and then the leading edge of the cam 63a engages the lower flat 60 to advance the film by another frame, (responsive to the remaining 35° movement of the cams) etc.

In accordance with the present invention, the shutter wheel 23 is mounted to turn free of the cams 63–64 by providing it with a central bearing hub 65 which is journaled on the inner end portion of the sleeve 62 and held in place by a retainer ring 62a. Thus, the shutter wheel is free to rotate while the film is at standstill. Between the cams 63–64 and the shutter wheel there is a clutch 66 of a single-tooth one-revolution integrating type. This clutch comprises a clutch member 67 splined to an outer hexagonally-shaped portion of the sleeve 62. The clutch member 67 has a single tooth 67a on its back end for engaging a single tooth 65a on the front end of the hub 65. The tooth 67a projects peripherally from the hub of the clutch member and has a portion trailing in a clockwise direction therefrom provided with a spiral cam face 67b on its back side, which runs out at the front side of the clutch member about 110° from the tooth 67a.

The clutch member 67 is biased into engaged position by a compression spring 68 between a retainer ring 69 on the front end of the shaft 24 and the clutch member, but the clutch member is held normally disengaged by an end pin 70 on the armature of a solenoid 71 bearing against the inner spiral cam face 67b. The solenoid 71 is mounted on a bracket 72 secured to the base 14, and is positioned so that the armature pin 70 stands radial to the shaft 24 (FIGURE 1). The pin 70 engages the spiral cam face 67b just clockwise from the tooth 67a to hold the clutch disengaged and to hold the cams 63–64 in the position before-described wherein the claws 44 have completed a frame advance of the film but are still in engagement therewith.

Upon energization of the solenoid 71 the pin 70 is withdrawn from the clutch member 67 to allow the clutch member to be pressed against the hub 65 by the spring 68. As soon as the shutter wheel 23 is turned through whatever fractional revolution is required to bring the tooth 65a against the tooth 67a the shutter wheel begins turning the cam 63–64. The clutch 66 is set in relation to the shutter wheel so that the 35° movement thereof during which the film is advanced by one frame will occur while an opaque portion of the shutter wheel is passing across the lens 40.

As is later described, the solenoid 71 is energized by a current pulse for a duration equal to a fraction (typically about one-half) of the time required for the shutter wheel to turn through one revolution. If the tooth 65a of the shutter wheel was less than about 120° from the tooth 67a when the pin 70 was disengaged from the clutch member, the subsequent release of the solenoid one-half turn later causes the pin 70 to be snapped back onto the hub of the clutch member 67 past the cam 67b. If the tooth 65a was more than about 120° from the tooth 67a when the solenoid 71 was energized, the subsequent release of the solenoid one-half turn later causes the pin at first to snap back onto the peripheral surface of the tooth 67a or the cam 67b, but when the shutter wheel has turned sufficiently to begin propelling the clutch member 67 the pin 70 will ride off of the tooth 67a and snap onto the hub of the clutch member. In either case, the pin 70 is returned onto the clutch member in position to engage the face of the spiral cam 67b and to disengage the clutch member after one revolution of movement of the cams 63–64.

The clutch 66 is set in relation to the shutter wheel so that the 35° movement thereof during which the film is advanced by one frame will occur while an opaque portion of the shutter wheel is passing across the lens 40.

If the solenoid 71 is held energized continuously the film will be advanced by successive steps during such energization to produce a motion picture. Such motion picture has a certain character as with respect to color balance, brightness, etc. due to the rotating shutter wheel.

By rotating the shutter wheel also during the still showing of a frame, the same character is retained as during showing of a motion. Due to the single revolution type of clutch employed the film is always stopped at the end of a motion run with the claws engaging the film at the end of a frame advance the same as occurs during the advance of a single frame.

The present projector is adapted for showing stock films at the usual speed of approximately 16 frames per second using the shutter wheel with four openings as herein shown. The resultant flicker—which is set at 64 c.p.s. ($4 \times 16$)—is not noticeable during the showing of motion or of stills even under conditions of high image brightness.

The reason a single frame advance cannot be detected by the eye is that the first rotating shutter wheel has a high momentum and the cams 63–64 have relatively low inertia with the result that a pulse operation of the solenoid 71 to engage the clutch 66 will cause the film to be advanced by one frame wholly within the time the lens 40 is blocked off without causing any consequential variation in the speed of the shutter wheel. Thus, no noticeable interruption is produced as the film is advanced from the still showing of one frame to the still showing of the next.

In order that the intense heat from the projector lamp 26 will not distort the film in the film gate during the still showing of a frame, an air conduit 73 is connected to an opening 74 in the sidewall of the holder 27 opposite the lens 40. In this conduit is a fan 75 and thermoelectric cooling module 76 (diagrammatically shown) so that air cooled below ambient temperature is blown onto the film at the lens. The fan is operable from an A.C. line 77 and the thermoelectric module is operated from a D.C. source 78.

A pulsing circuit for operating the solenoid 71 to produce a single frame advance of the film is shown in FIGURE 7. This circuit includes three transistors $Q_1$, $Q_2$ and $Q_3$ connected between a D.C. source indicated at 78 and a reference line 79 which in turn is connectable through a switch 80 to ground 81. The transistor $Q_1$ is of the unijunction type having its emitter connected between a condenser $C_1$ and an adjustable resistor $R_1$ the two of which are connected serially between the voltage source 78 and the reference line 79. The base 1 of transistor $Q_1$ is connected through a resistor $R_2$ to the line 79 and the base 2 of the transistor $Q_1$ is connected through a resistor $R_3$ to a source 78. Also, the base 1 is connected through a resistor $R_4$ to the base of the transistor $Q_2$. The emitter of the transistor $Q_2$ is connected directly to the line 79 and the collector of this transistor is connected through a resistor $R_5$ to the source 78 and through a resistor $R_6$ to the base of the transistor $Q_3$. The emitter of the transistor $Q_3$ is connected directly to the line 79 and the collector is connected through the solenoid 71 to the D.C. source 78. A switch 82 is closable to connect the solenoid directly across the D.C. source 78.

When the switch 80 is closed, the transistors $Q_1$ and $Q_2$ are immediately biased to cutoff. While the transistor $Q_2$ is biased off, the base of the transistor $Q_3$ is connected to the D.C. source 78 via the resistors $R_6$ and $R_5$, causing the transistor $Q_3$ to be conductive and the solenoid 71 to be energized. When the condenser $C_1$ becomes charged to the point where the transistors $Q_1$ and $Q_2$ are turned on, the collector of the transistor $Q_2$ drops to within a few tenths of a volt to turn off the transistor $Q_3$ and release the solenoid 71. The time required for the condenser $C_1$ to charge via the resistor $R_1$ determines the duration of the pulse operation of the solenoid. Pulse lengths can therefore be varied by adjusting the resistor $R_1$. So long as the switch 80 is kept closed, the condenser $C_1$ never discharges to the point where the transistor $Q_1$ goes off again. Thus, after the pulse operation of the solenoid, the transistors $Q_1$ and $Q_2$ remain on and the transistor $Q_3$ remains off to keep the solenoid deenergized. If a motion picture run is desired, the operator simply closes the switch 82 to connect the D.C. source 78 across the solenoid 71. The resulting energization of the solenoid 71 causes the drive member 45 to be driven continuously so that the film will be advanced by successive frames at a rate of one frame for each revolution of the shutter.

The embodiments of our invention herein particularly shown and described are intended to be illustrative and not necessarily limitative of our invention since the same are subject to changes and modifications without departure from the scope of our invention, which we endeavor to express according to the following claims.

We claim:

1. A picture projector including a motion picture film having successive frames and respective drive holes, a projector lens, a rotatably mounted shutter having transparent and opaque portions moved across the lens, a motor for rotating said shutter, drive means for engaging successive drive holes in said film to advance the film by successive frames, said drive means including a rotatable drive member effective to advance said film by one frame during each revolution thereof, a drive clutch between said shutter and said drive means, pulse means operable with a time duration less than the time for said shutter to complete one revolution for engaging said drive clutch, and means rendered effective upon the deactivation of said pulse means for disengaging the drive clutch at the end of the revolution then underway.

2. A picture projection including a motion picture film having successive frames and respective drive holes, a projector lens, a rotatably mounted shutter having transparent and opaque portions moved across said lens, a motor for rotating said shutter, a drive claw for engaging successive drive holes in said film and advancing the film by successive frames, a rotatable means including a first means for completing one reciprocation of said drive claw horizontally into and out of engagement with said film during each revolution of said rotatable means and a second means for reciprocating said drive claw in a vertical plane by a half cycle after each half cycle of its horizontal movement whereby the film is advanced one frame for each revolution of said rotatable means, and a drive clutch between said shutter and said rotatable means selectively operable to advance said rotatable means a single revolution or a series of complete revolutions, spring means urging said clutch into engaged position, latch means for holding the clutch disengaged, a solenoid operable for releasing said latch means, and cam means operable upon deenergization of said solenoid for disengaging the clutch at the end of the revolution of movement then underway.

3. The picture projector set forth in claim 2 including a pulse circuit, a control switch in said pulse circuit operable to cause the pulse circuit to feed energizing current to said solenoid for a time duration equal to a fraction of the time for said shutter to complete one revolution of movement, and a power circuit including a second control switch operable to feed energizing current to said solenoid to cause said cam device to be rotated continuously by said shutter.

4. A picture projector including a motion picture film having successive frames and respective drive holes, a projector lens, a rotatably mounted shutter having transparent and opaque portions moved across said lens, a motor for rotating said shutter, a drive pawl for engaging successive drive holes in said film and advancing the film by successive frames, a rotatable cam device having a first cam face for completing one reciprocation of said drive claw horizontally into and out of engagement with said film during each revolution of said cam device and having a second cam face for reciprocating said drive claw in a vertical plane by a half cycle after each half cycle of its horizontal movement whereby the film is advanced one frame for each revolution of said cam device, a drive clutch between said shutter and said cam device spring biased to engaged position and selectively operable to rotate said cam device a single revolution or a series of revolutions, and wherein said clutch includes a first single-tooth clutch member splined to said cam device, a second cooperating single-tooth clutch member secured to said shutter, a fractional helical cam face on said first clutch member, a pin for engaging said cam face to hold said first clutch member out of engagement from said second clutch member in a start position of said cam device, a solenoid for disengaging said pin to permit engagement of said clutch, and spring means for moving said pin into the path of said helical cam when said solenoid is deenergized whereby to disengage said clutch at the end of the full revolution of movement then underway.

References Cited
UNITED STATES PATENTS

| | | | |
|---|---|---|---|
| 1,802,045 | 4/1931 | Bogopolsky | 352—147 |
| 1,944,029 | 1/1934 | Foster | 352—147 |
| 2,173,230 | 9/1939 | Kellogg | 352—194 |
| 2,413,288 | 12/1946 | Cahill. | |
| 3,301,628 | 1/1967 | Hellmund | 352—437 |
| 3,152,741 | 10/1964 | Jorgensen | 352—194 X |

NORTON ANSHER, Primary Examiner

MONROE H. HAYES, Assistant Examiner

U.S. Cl. X.R.

352—137, 147